United States Patent [19]

Izawa

[11] Patent Number: 5,152,201
[45] Date of Patent: Oct. 6, 1992

[54] HEADSTOCK-RECIPROCATING-TYPE AUTOMATIC LATHE AND MACHINING METHOD USING THE SAME

[75] Inventor: Hiromi Izawa, Shimizu, Japan

[73] Assignee: Star Micronics Co., Ltd., Shizuoka, Japan

[21] Appl. No.: 725,391

[22] Filed: Jun. 27, 1991

Related U.S. Application Data

[62] Division of Ser. No. 440,598, Nov. 22, 1989, abandoned.

[30] Foreign Application Priority Data

Nov. 30, 1988 [JP] Japan ................. 63-303301

[51] Int. Cl.⁵ .................... B23B 1/00; B23B 7/06
[52] U.S. Cl. .................... 82/1.11; 82/129
[58] Field of Search ............ 82/117, 124, 129, 162, 82/164, 1.11; 29/36, 27 C

[56] References Cited

U.S. PATENT DOCUMENTS

| | | | |
|---|---|---|---|
| 3,274,867 | 9/1965 | Sell | 82/164 |
| 3,600,990 | 8/1971 | Renoux | 82/162 |
| 4,072,071 | 2/1978 | Sato et al. | |
| 4,457,193 | 7/1984 | Matthey | 82/124 |
| 4,612,832 | 9/1986 | Ushigoe | 29/36 |
| 4,719,676 | 1/1988 | Sansone | 82/129 |
| 4,987,807 | 1/1991 | Simon | 82/129 X |
| 5,095,598 | 3/1992 | Hiroshi et al. | 82/129 X |

FOREIGN PATENT DOCUMENTS

| | | |
|---|---|---|
| 5593 | 4/1964 | Japan. |
| 61783 | 6/1974 | Japan. |
| 46389 | 11/1977 | Japan. |
| 157403 | 12/1980 | Japan. |
| 4441 | 1/1982 | Japan. |
| 62401 | 4/1985 | Japan. |
| 0177801 | 9/1985 | Japan ................. 82/129 |
| 86102 | 5/1986 | Japan. |
| 130102 | 6/1987 | Japan. |
| 152603 | 7/1988 | Japan. |
| 0300802 | 12/1988 | Japan ................. 82/129 |
| 121102 | 5/1989 | Japan. |

Primary Examiner—Z. R. Bilinsky
Attorney, Agent, or Firm—Koda and Androlia

[57] ABSTRACT

In machining a blank material on an automatic lathe of the type having first and second headstocks slidably carried along a bed, the first and second headstocks are slidable along their respective machining axes, and the first headstock grips the blank material to take a front machining, whereupon the semi-machined blank material, i.e., a workpiece is transferred to the second headstock to take a rear machining. The lathe also has first and second guide bushes for intermediately guiding the workpiece near the working point while the workpiece is gripped by the first and second headstocks. For machining a blank material in the form of a cylindrical rod continuously, the entire machining cycle can be divided into the front and rear machinings. Thus it is possible to shorten the machining cycle period.

3 Claims, 13 Drawing Sheets

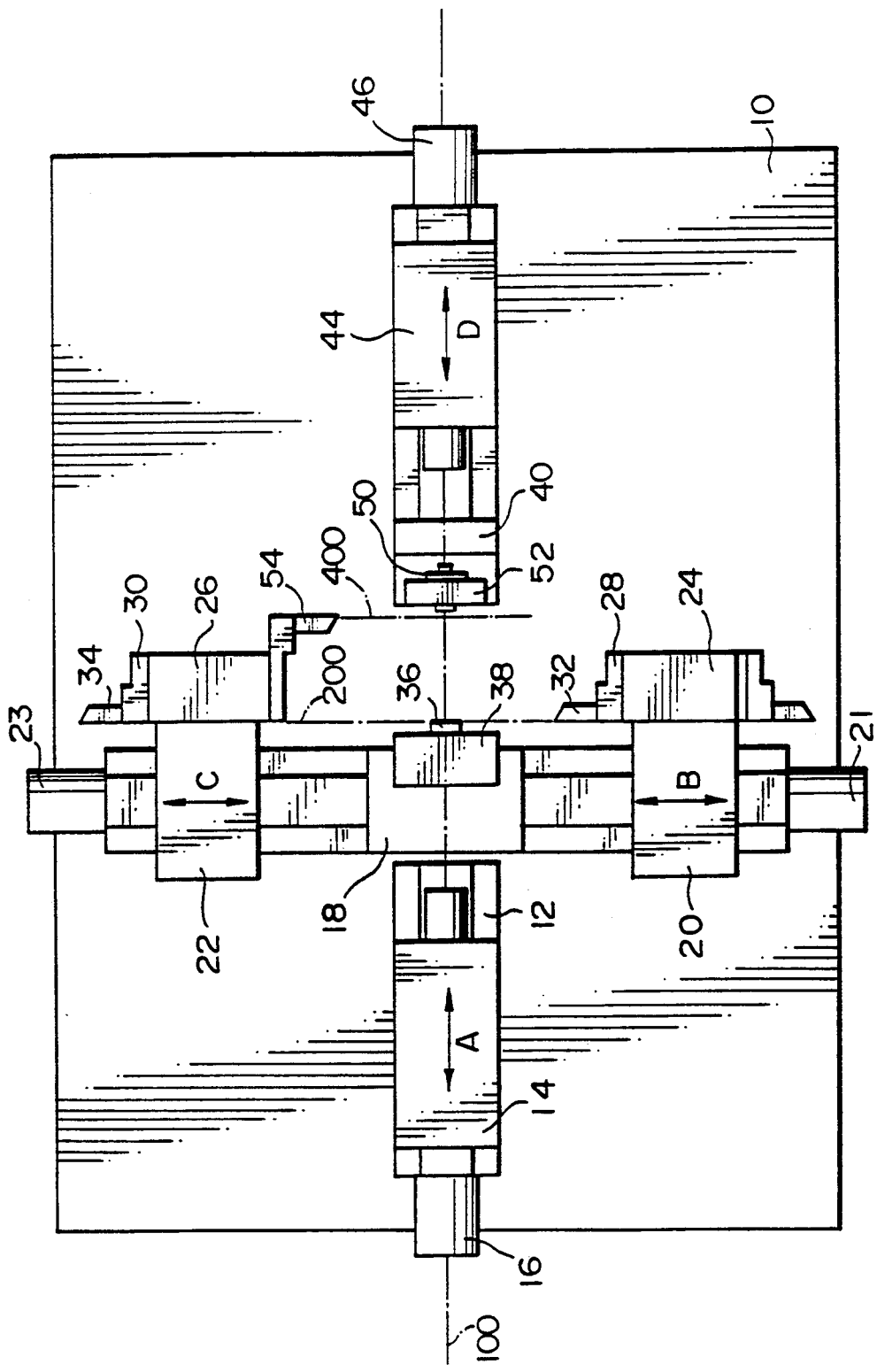

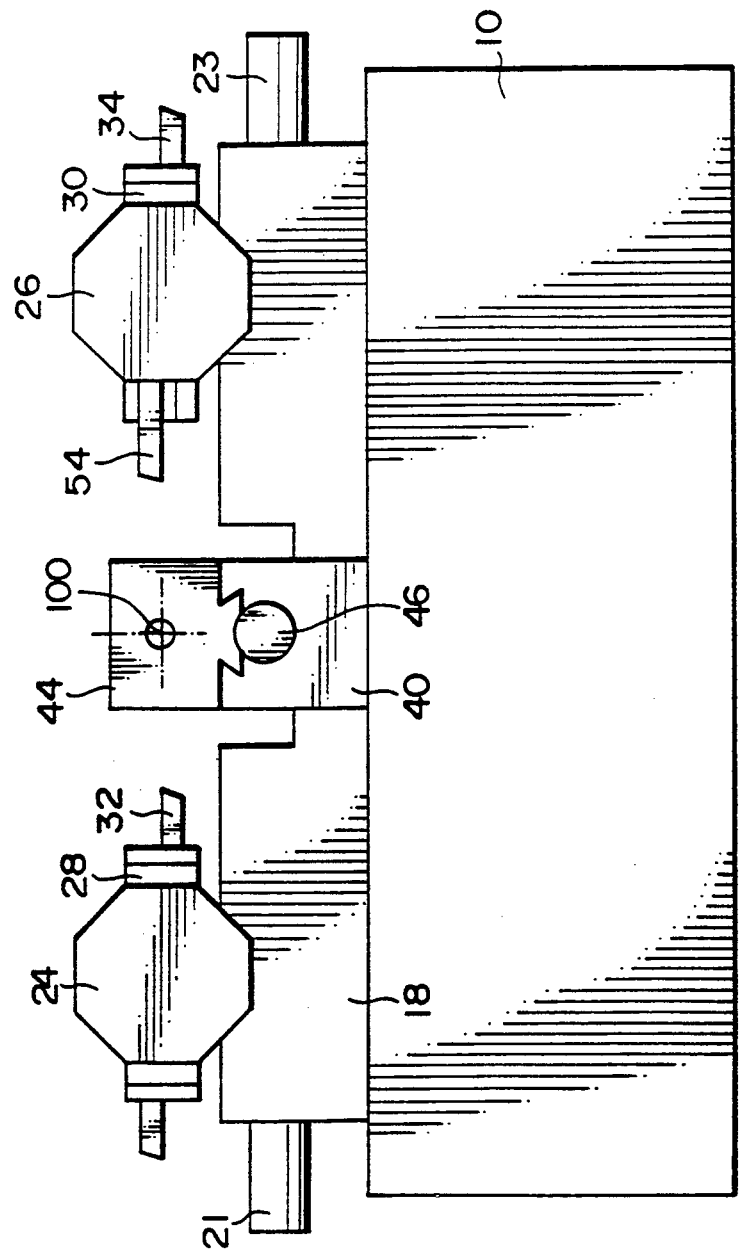

HEADSTOCK-RECIPROCATING-TYPE AUTOMATIC LATHE AND MACHINING METHOD USING THE SAME

This is a division of application Ser. No. 440,598, filed Nov. 22, 1989, abandoned.

BACKGROUND OF THE INVENTION

1. Field of the Invention

This invention relates to a headstock-reciprocating-type automatic lathe and a machining method using it, and more particularly to a workpiece supporting mechanism and method, for a headstock-receiprocating-type automatic lathe, which has first and second headstocks and is capable of performing front and rear machinings.

2. Description of the Prior Art

Heretofore, automatic lathes are known in which the gripping of a workpiece, the cutting of the workpiece in multiple steps into a desired shape by using a plurality of cutting tools, and the discharging of the finished workpiece are performed in an almost fully automated fashion. In modern machining industries, this automatic lathe constitutes an essential part of a turning center or the like and is usually numerically controlled by a computer.

Various types of automatic lathes are now available on the market; in particular, a headstock-reciprocating-type automatic lathe, in which a headstock gripping the workpiece gives to the workpiece a driving rotation and slides on the bed along the machining axis, is most widely used as a relatively small-sized and precise machining unit.

In this type of automatic lathe, since the movement of the workpiece along the machining axis is assigned to the headstock and, on the other hand, the movement of the workpiece in the cutting direction is assigned to the cutting tool, a very efficient machining can be achieved in cooperation of these two members. Further, since the headstock performs all the way from the gripping of the workpiece to the moving of the workpiece especially when many workpieces are to be taken from a continuous length of blank material in a continuous manner, it is possible to continuously machine the elongated blank material with good efficiency.

Still further, since it is unnecessary to move the cutting tool on the bed in the machining axis, a turret on which various cutting tools are detachably supported can be stably held in a proper position. Consequently, vibrations, which were inevitable with the cutting-tool-moving type, can be reduced to a minimum, thus guaranteeing excellent quality products.

However, with this type of automatic lathe, since the headstock grips only one end of the blank material during the machining, the length of a projected or overhang part of the blank material would necessarily be large if the cutting range is long. The overhang part of the blank material tends to be deformed due to lateral pressure during the machining, thus impairing the machining precision. To this end, it has been proposed to use a guide bush for supporting the overhang part of the blank material near the working point of the cutting tool in such a manner that the blank material to be machined normally projects a little beyond the guide bush to the working point of the cutting tool. This guide bush was a remedy for the bad effect of the cantilevered supporting.

This type of automatic lathe is well known as a Swiss-type automatic. Yet in recent years, it has been realized to add a second headstock to perform a rear machining, in addition to a front machining to be performed by the first headstock.

Upon completion of the front machining by the first headstock, the second headstock grips the other end of the workpiece and gives a predetermined driving rotation to the workpiece to take the final machining, thus causing an expanded function of the Swiss-type automatic lathe.

The second headstock is also slidable in the machining axis of the first headstock; as the second headstock takes the final machining and subsequently discharges the workpiece, the first headstock can stand by for the machining of the next blank material. This arrangement was accordingly very effective in shortening the entire cycle of process.

However, the primary object of this conventional double-headstock automatic lathe is to take a cutting on the end surface of the workpiece, as a rear machining, by the second headstock. This conventional lathe is used only for machining the end surface of the workpiece, which has been removed from the first headstock, to measure. That is, in the prior art, the second headstock plays as just an assistant to help the first headstock in taking the final stage of the machining of the workpiece.

Consequently, in the proportion of the front and rear machinings, the former is the overhelmingly majority. During the rear machining, all expected reduction of the machining cycle was only enough to make it ready for the front machining of the next cycle.

With this prior art, because the second headstock also supports the workpiece at only one end thereof, the allowable length of the overhang part of the workpiece is about twice or triple the diameter of the supported portion of the workpiece to secure a highly precise machining against any lateral pressure. Thus the range in which the rear machining can be performed was remarkably restricted.

SUMMARY OF THE INVENTION

It is therefore an object of this invention to provide an improved headstock-reciprocating-type automatic lathe in which the workpiece can be supported in a proper posture even during the rear machining and in which the range of the rear machining can be expanded.

Another object of the invention is to provide a machining method using such an improved headstock-reciprocating-type automatic lathe.

According to a primary feature of this invention, a headstock-reciprocating-type automatic lathe has an additional guide bush for intermediately guiding the workpiece near the working point of a cutting tool along the machining axis of the second headstock.

For another feature of the invention, the second headstock is slidable in a direction perpendicular to the machining axis of the first headstock and has a rear machining axis different from the machining axis of the first headstock.

In an alternative form, the first and second headstocks may have a common machining axis. In this case, the second headstock is slidable on and along the machining axis of the first headstock.

With this arrangement, since the workpiece is intermediately guided by the second guide bush as the second headstock grips the other end of the workpiece after completion of the front machining, the length of the overhang part of the workpiece is adequately large so that the range to be shaped by the rear machining can be remarkably expanded to an extent substantially equal to the range of the front machining.

As a consequence, if the entire machining cycle is divided into front and rear equal parts, the first headstock can take the front machining of the next blank material during the rear machining, thus reducing the entire machining time remarkably.

Further, by locating the maching axis of the first headstock and the machining axis of the second headstock at different positions, the first machining and the rear machining can be performed at remotely spaced positions, thus eliminating the machining restrictions due to the interference of the cutting tools.

Furthermore, if the first and second headstocks have a common machining axis, the working points of the two headstocks are located at axially spaced positions, and the sliding motion in the direction perpendicular to the machining axis of the second headstock. Accordingly, it is possible to make the lathe simple in construction and also to reduce the machining time.

The above and other advantages, features and additional objects of this invention will be manifest to those versed in the art upon making reference to the following detailed description and the accompanying drawings in which several structural embodiments incorporating the principles of this invention are shown by way of illustrative example.

BRIEF DESCRIPTION OF THE DRAWINGS

FIG. 7 is a plan view similar to FIG. 1, showing a second embodiment of this invention;

FIG. 9 is a side elevational view of the lathe of the second embodiment;

DETAILED DESCRIPTION

Figure 1:
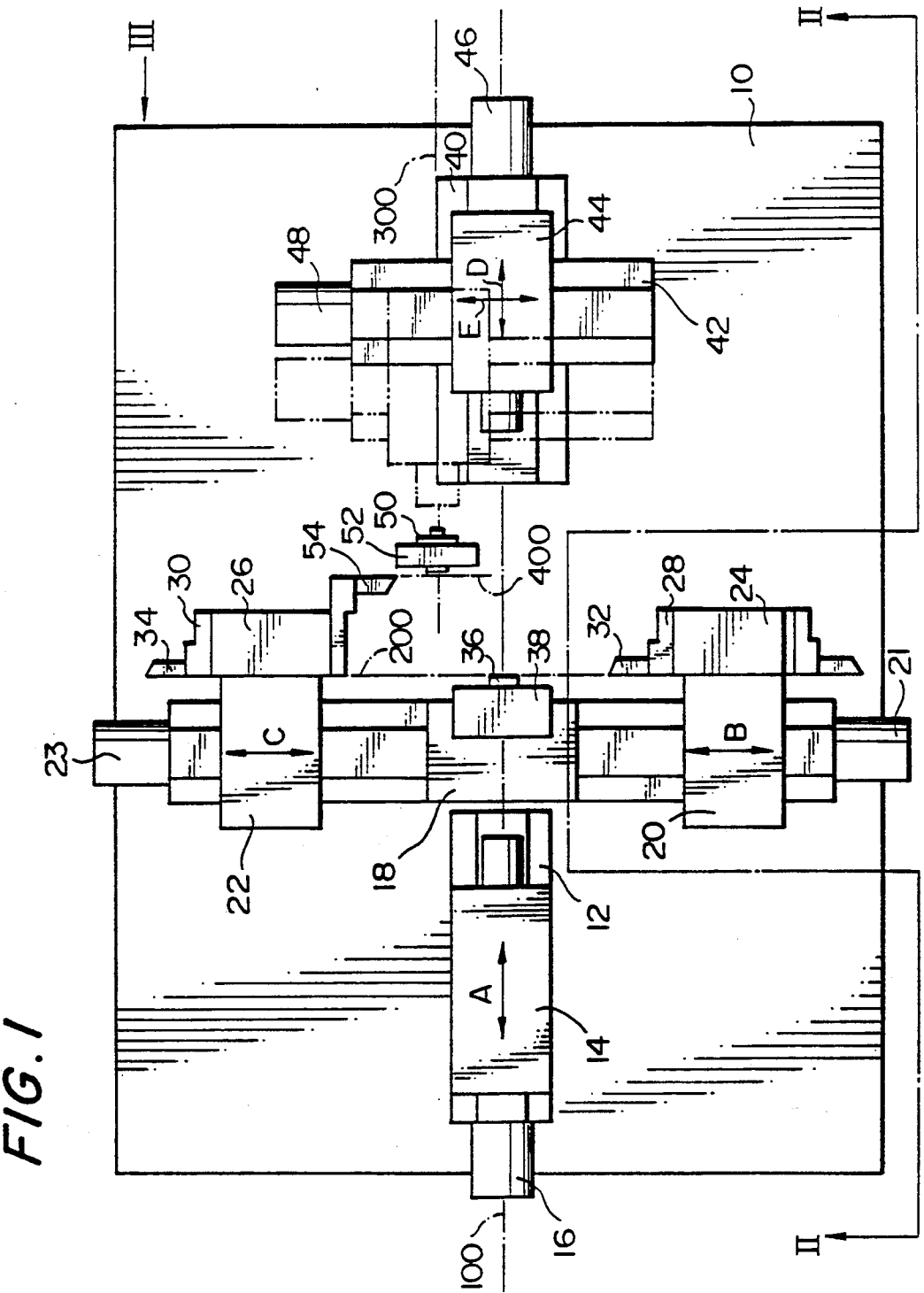
FIG. 1 is a plan view of a headstock-reciprocating-type automatic lathe according to a first embodiment of this invention.
Figure 2:
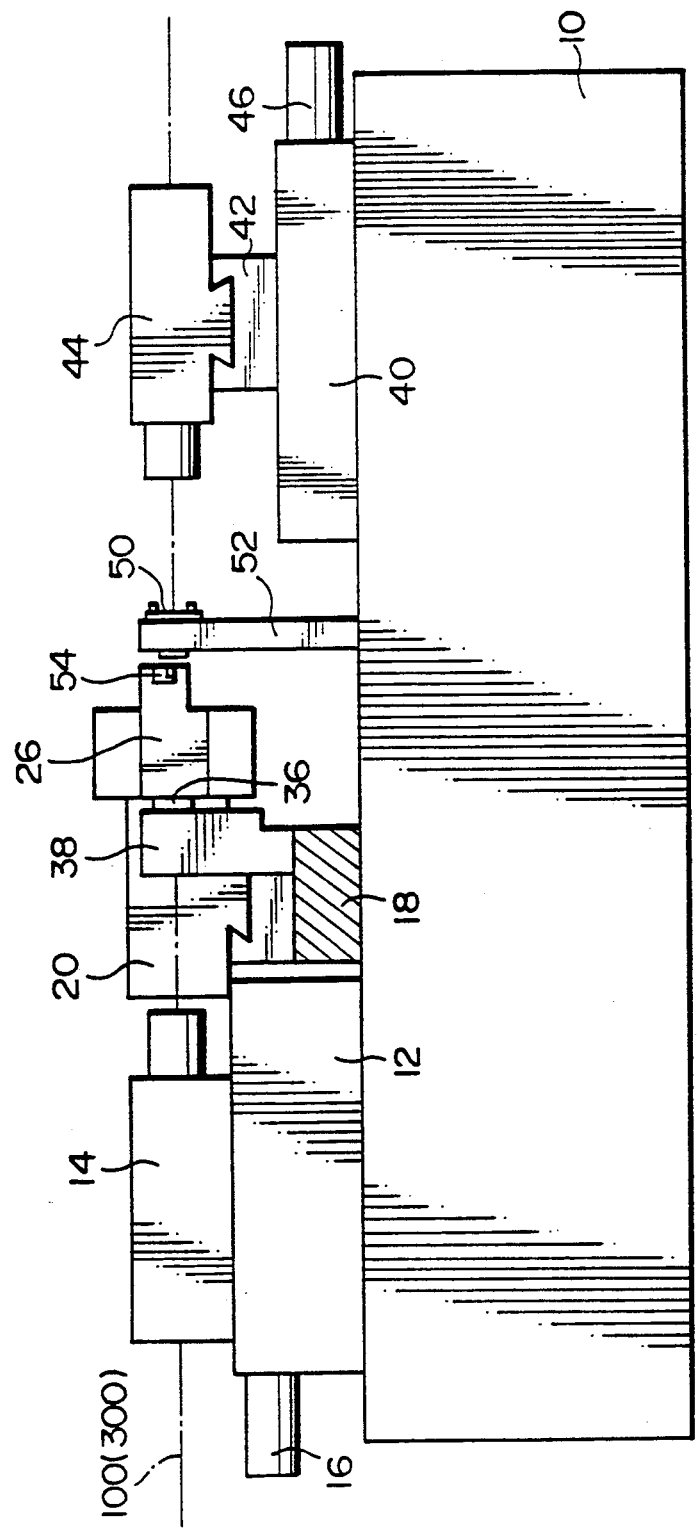
FIG. 2 is a front elevational view, with a first cutter support block omitted, of the lathe of the first embodiment.
Figure 3:
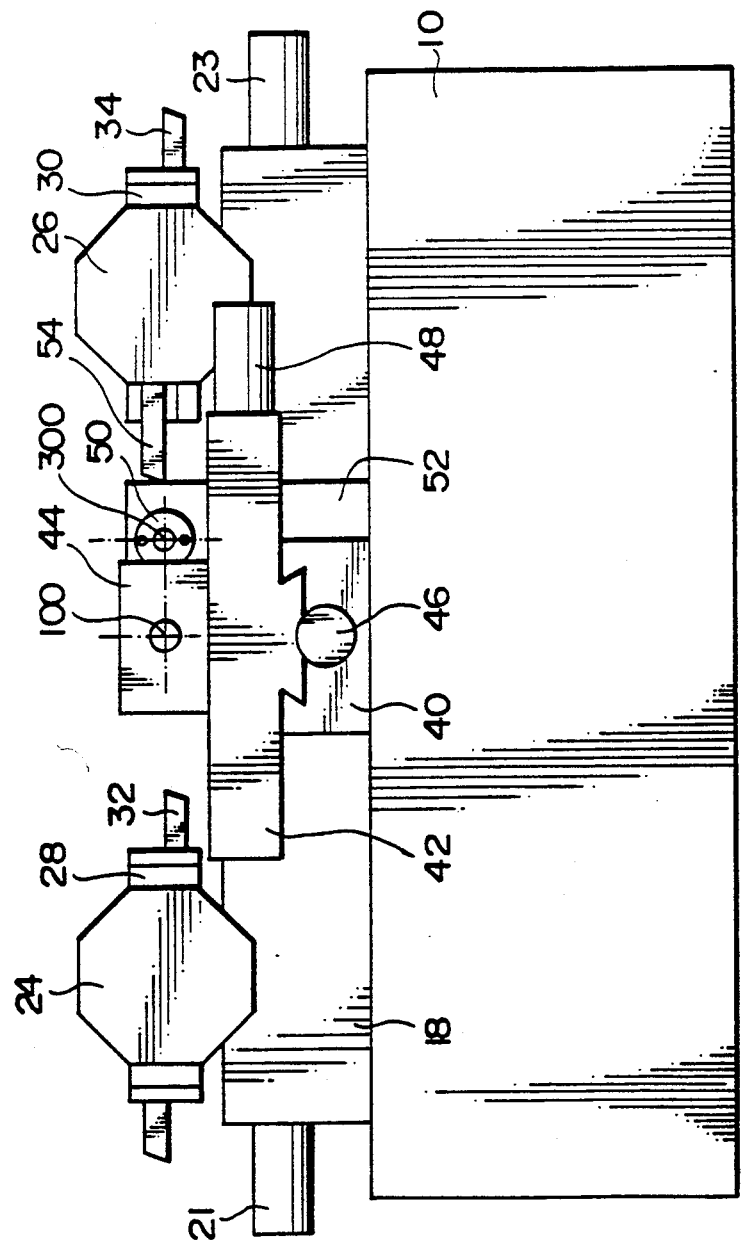
FIG. 3 is a side elevational of the lathe of the first embodiment.

The principles of this invention will be particularly useful when embodied in a headstock-reciprocating-type automatic lathe (hereinafter called "lathe") such as shown in FIGS. 1, 2 and 3. In the lathe, a first headstock 14 is slidably movably carried on a base 12 fixed to a bed 10. The first headstock 14 is slidably movable on the base 12 in a direction of an arrow A along a first machining axis 100.

The movement of the first headstock 14 is controlled by a servo motor 16 supported on the base 12. Consequently, though there is no detailed illustration in the drawings, under the control of a computer according to a predetermined machining program, the first headstock 14 grips a blank material, e.g., an elongated or continuous-length cylindrical rod, then moves the blank material to a working point of a cutting tool (described below), and rotates the blank material for machining. The headstock 14 can be moved along the first machining axis 100 by the servo motor 16.

A first tool post 20 and a second tool post 22 are reciprocatingly slidably carried on a base 18 fixed to the bed 10. The first and second tool posts 20, 22 are reciprocatingly movable on the base 18 perpendicularly to the first machining axis 100 as indicated by arrows B, C, respectively.

The movements of the first and second tool posts 20, 22 in the directions of the arrows B, C are controlled by a pair of servo motors 21, 23, respectively, supported on the base 18.

A first turret 24 and a second turret 26 are rotatably supported on the first and second tool posts 20, 22, respectively. On the first and second turrets 24, 26, a first set of various cutting tools 32 and a second set of various cutting tools 34 are detachably supported via a pair of tool holders 28, 30, respectively, so that a desired machining can be performed.

As the first and second tool posts 20, 22 slides on the bed 18, the cutting tools 32, 34 moves along a cutting axis 200. The working point of the workpiece is defined by the crossing point of the cutting axis 200 and the the workpiece.

It is a common knowledge that when locating the blank material in the working point, the overhang part of the blank material will be remarkably large in length if the blank material is supported at only one end by the first headstock 14. To this end, the lathe is equipped with a first guide bush 36 fixed to a first guide bush holder 38 fixed to the base 18.

The blank material is therefore intermediately guided near the working point by the first guide bush 36 so that a desired precise machining can be performed by the cutting tools 32, 34.

According to this embodiment, for making a rear machining on the workpiece, a slide base 42 is reciprocatingly slidably carried on a base 40 fixed to the bed 10. The slide base 42 is reciprocatingly slidable in the direction of an arrow D along the first machining axis 100.

On this slide base 42, a second headstock 44 is carried so as to be reciprocatingly slidable in the direction of an arrow E perpendicular to the first machining axis 100. Consequently, the second headstock 44 is movable optionally either along the first machining axis 100 or in the direction perpendicular to the first machining axis 100.

A rear or second machining axis of the second headstock 44 is designated by 300. The second machining axis 300 is out of axial alignment with the first machining axis 100. The second headstock 44 grips the other end of the workpiece on the first machining axis 100 and then slides in the direction of an arrow E to take a desired rear machining along the second machining axis 300.

A pair of servo motors 46, 48 are supported on the base 40 and the slide base 42 for moving the second headstock 44 in the optional direction of either the arrow D or the arrow E.

For a significant feature of this invention, the lathe is also equipped with a second guide bush 50 for intermediately guiding the workpiece near the working point while the rear machining is being performed along the second machining axis 300 by the second headstock 44. In this embodiment, the second guide bush 50 is fixed to the bed 10 by a second guide bush holder 52.

The guide bush 50 is disposed in axial alignment with the second machining axis 300, and can intermediately guide the workpiece near a second working point as the second headstock 44 grips the workpiece and slides it along the second machining axis 300, as shown in phantom lines in FIG. 1.

The rear machining is performed by a rear cutting tool 54 detachably held by the second turret 26; the crossing point of a second cutting axis 400 and the workpiece defines the rear working point.

During this rear machining, if the second headstock 44 supports the workpiece with a relatively large overhang thereof, e.g., if the extent of overhang is more than ten times the diameter of the gripped portion of the workpiece, it is possible to keep the workpiece in a proper posture against lateral pressure when the maching range is large, thus realizing a highly precise machining.

Figure 4:
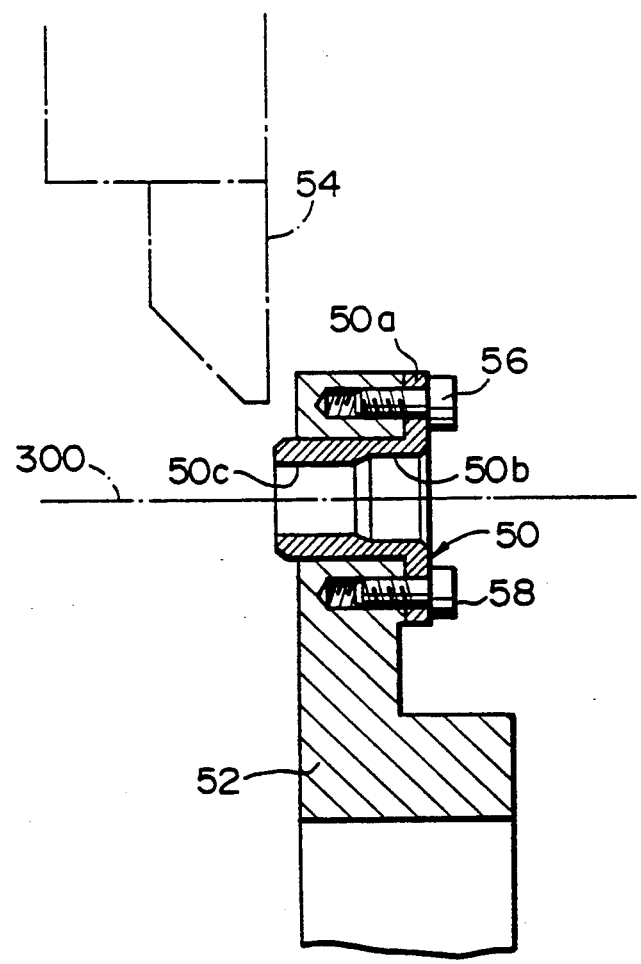
FIG. 4 is a detail cross-sectional view of a second guide bush of the lathe of the first embodiment.

FIG. 4 shows a preferred example of the second guide bush 50. In FIG. 4, the second guide bush 50 is firmly fastened to the second guide bush holder 52 by screws 56, 58 extending through a flange 50 of the second guide bush 50.

The second guide bush 50 has a receiving taper surface 50b on the workpiece side and can guide the workpiece exactly onto a guide surface 50c of the second guide bush 50.

FIGS. 5A through 5D show a cycle of progressive machining steps according to the first embodiment. FIG. 6A shows a workpiece machined by the front machining according to this embodiment, and FIG. 6B shows a workpiece machined by the front and rear machining.

Figure 5A:
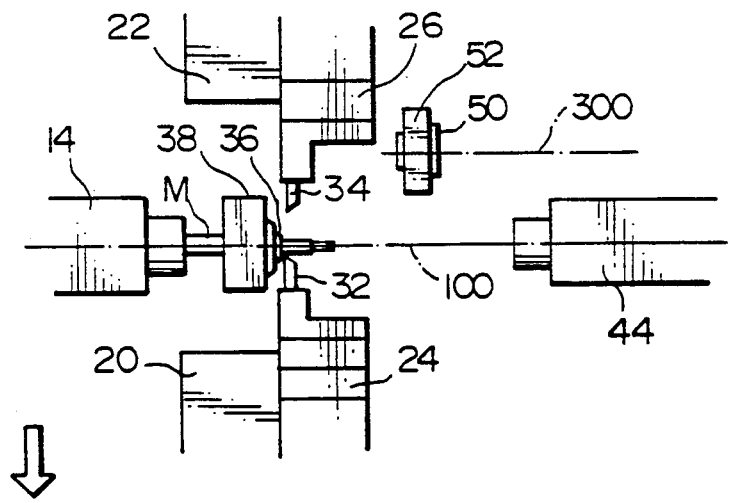
FIGS. 5A through 5D show a cycle of progressive machining steps of the first embodiment.
Figure 6A:
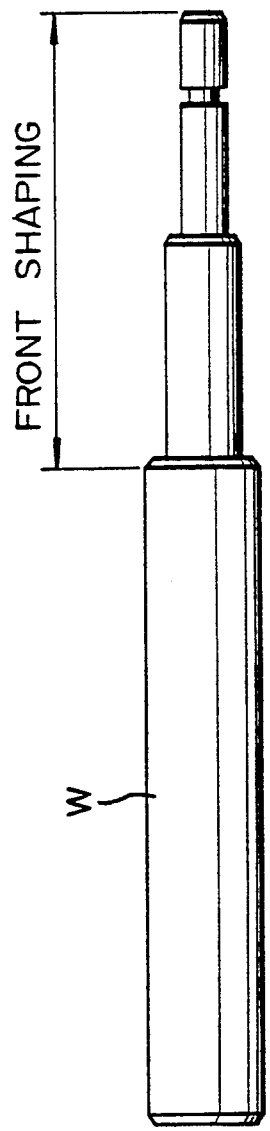
FIG. 6A shows a workpiece machined by a front machining according to the first embodiment.
Figure 6B:
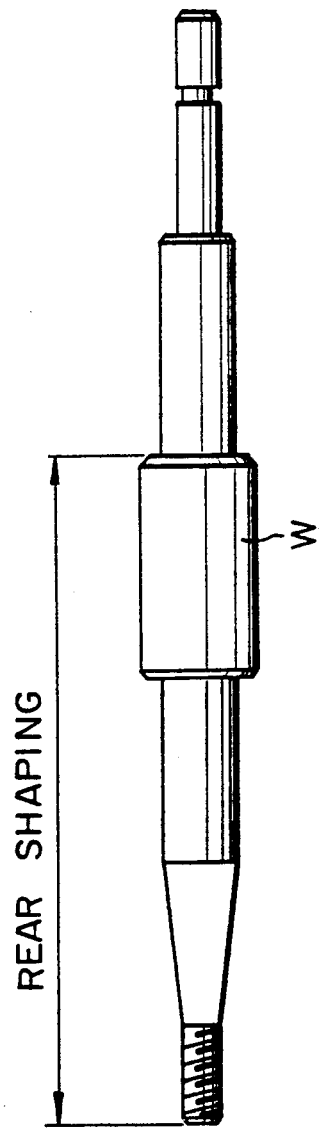
FIG. 6B shows a workpiece machined by first and second machinings according to the first embodiment.

Specifically, in FIG. 5A, the front machining is performed as the first headstock 14 grips the blank material M and moves the same along the first machining axis 100. Here the front machining is carried out by the cutting tool 32 of the first turret 24. The thus machined workpiece is shown in FIG. 6A; substantially a half of the machining cycle is assigned to the front machining by the first headstock.

During this front machining, in the drawings, the second headstock 44 stands by at a position remote from the working point along the first machining axis 100. Practically, however, the second headstock 44 is doing usually the rear maching during the front machining by the first headstock 14, as described below.

Figure 5B:
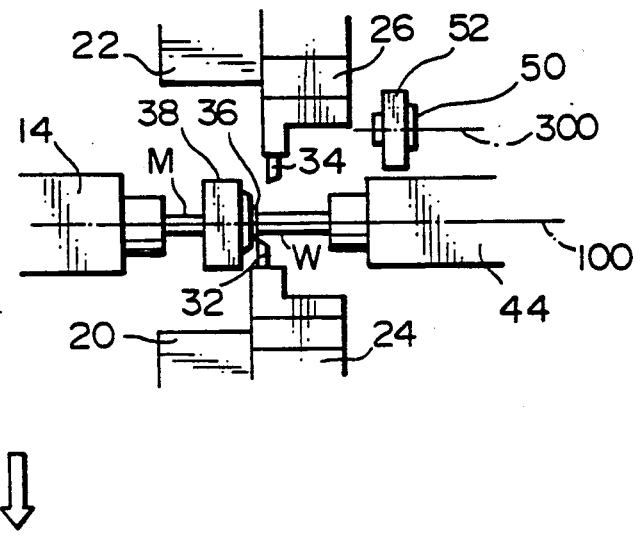

Upon completion of the front machining, as shown in FIG. 5B, the first headstock 14 moves the blank material M and the workpiece W forwardly along the first machining axis 100 and, meanwhile, the second headstock 44 advances to receive the other end of the workpiece W.

In the illustrated embodiment, the workpiece W is severed from the blank material M at the final stage of the front machining, immediately before which the second headstock 44 grips the other end of the workpiece W. Thus, the workpiece W on which the front machining has been completed and which is shown in FIG. 6A is assigned to the second headstock 44, whereupon the rear machining starts.

Figure 5C:
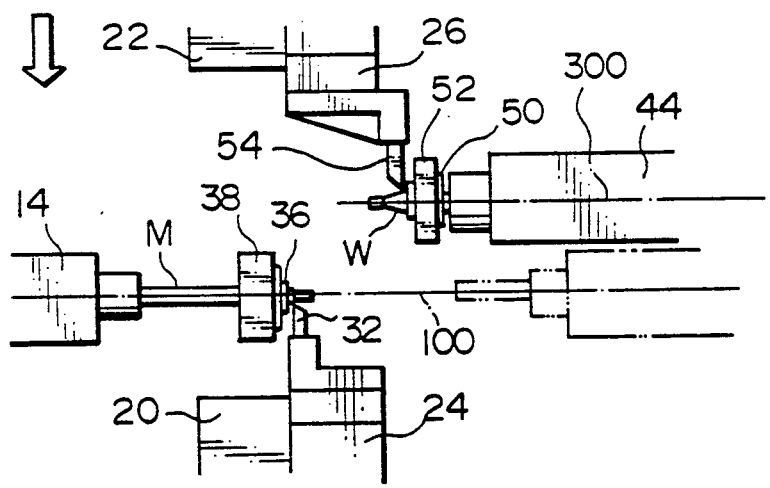

In FIG. 5C, a desired rear machining is performed by the rear cutting tool 54 as the second headstock 44 slides the workpiece W onto the second maching axis 300, and then the second guide bush 50 intermediately guides the workpiece W. During this rear machining, the workpiece W projects or overhangs from the second headstock 44 to a relatively large extent. As is apparent from FIG. 5C, however, since the practical rear machining is carried out as the workpiece W is intermediately guided near the working point by the second guide bush 50, a highly precise machining can be achieved even when any large lateral pressure is exerted on the workpiece W.

Meanwhile, during this rear machining, the first headstock 14 already grips the next blank material M to take the front machining. By thus performing the front and rear machinings concurrently, it is possible to shorten the entire machining cycle to a minimum.

Figure 5D:
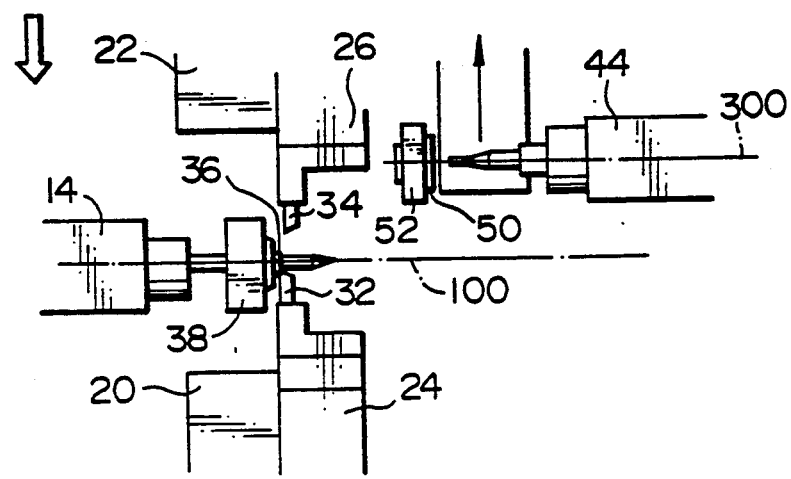

In FIG. 5D, the workpiece W completed with the front and rear machinings is pulled out from the second guide bush 50 by the second headstock 44 so that the workpiece may be discharged from the lathe. As a result, the workpiece W completed with the first and second machinings has been obtained as shown in FIG. 6B. The workpiece may be discharged by blowing air from the rear end of the second headstock 44, pushing out by a push rod via a cylinder unit or handling by a robot.

Also in FIG. 5D, during the discharging, the distance between the second guide bush 50 and the second headstock 44 must be more than the length of the workpiece to take out the workpiece from the second headstock 44.

At that time, the first headstock 14 has almost completed the front machining, and the second headstock 44 slides back to the position of FIG. 5A. The foregoing machining procedures are repeated.

As described above, according to this invention, since the second guide bush is used to support the other end of the workpiece so as to have an adequate overhang during the rear machining, the workpiece such as in the form of a cylindrical rod can be shaped not only at its end surface but also its side peripheral surface, thus expanding the range of the rear machining to a remarkable extent.

Consequently, by performing the front and rear machinings concurrently, it is possible to shorten the entire machine cycle to a minimum.

According to the first embodiment, since the second machining axis is located out of axial alignment with the first machining axis, the moving ranges of the cutting tools and other members can be set to adequate largeness. Therefore complex machinings of both the front and rear parts of the workpiece can be achieved.

Figure 8:
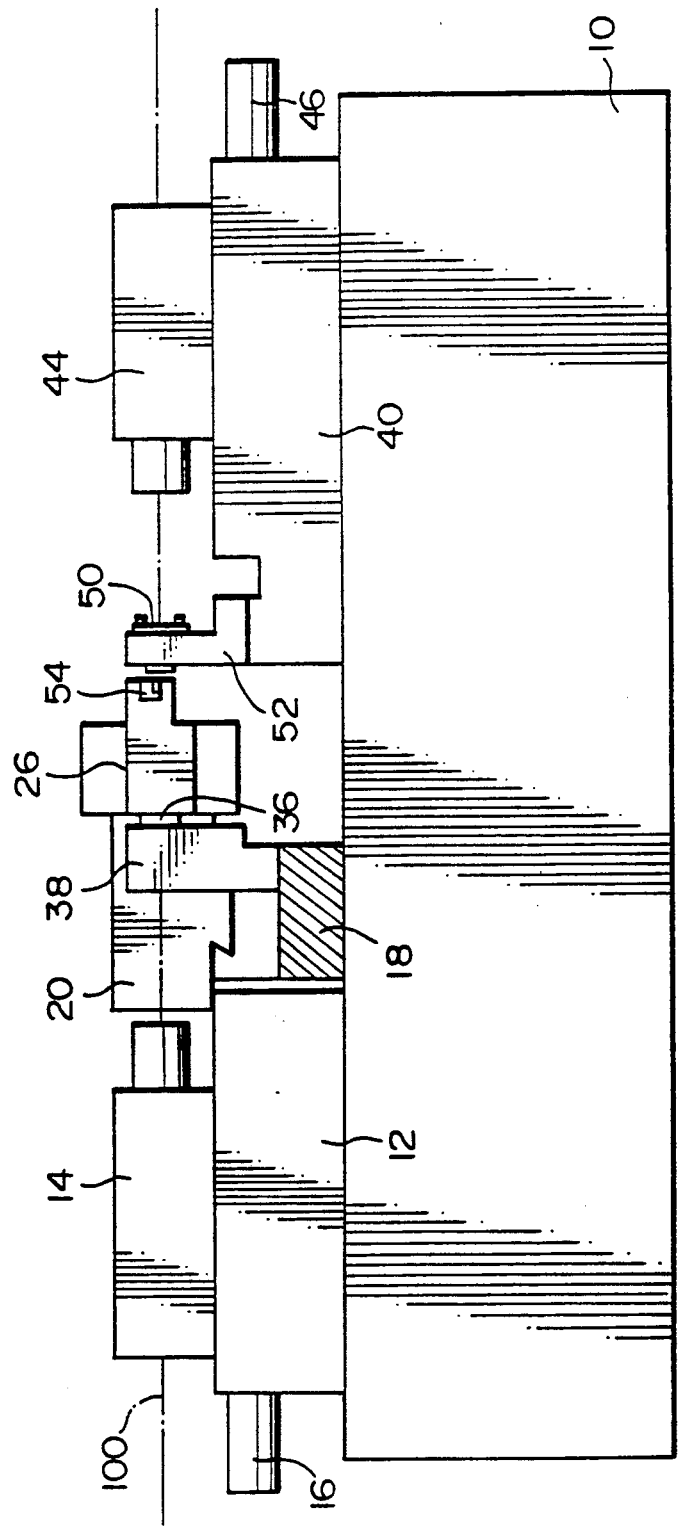
FIG. 8 is a front elevational view, with parts broken away, of the lathe of the second embodiment.

FIGS. 7, 8 and 9 show a modified lathe according to a second embodiment of this invention. Parts similar to those of the first embodiment are designated by like reference numerals; their detailed description is omitted here for clarity.

For a significant feature of this second embodiment, the second headstock 44 is slidable only along the first machining axis 100 and, unlike the first embodiment, is not slidable in a direction perpendicular to the first machining axis 100.

Likewise, the second guide bush 50 is located in axial alignment with the first machining axis 100, and is supported by the guide bush holder 52 fixed to the base 40.

The lathe of this second embodiment is simple in construction. Further, since the second headstock is from any lateral sliding movement, it is possible to shorten the machining cycle to such extent.

To obtain adequate moving allowance for the individual cutting tools when performing the front and rear machinings concurrently, the second headstock 44 moves along the first machining axis to an adequate extent, as indicated by the arrow D.

According to the second embodiment, in which the lathe has a common machining axis for the front and rear machinings, the workpiece can be supported at two points by the first guide bush 36 and the second guide bush 50 during the front machining, if necessary.

FIGS. 10A through 10D show a cycle of progressive machining steps according to the second embodiment.

Figure 10A:
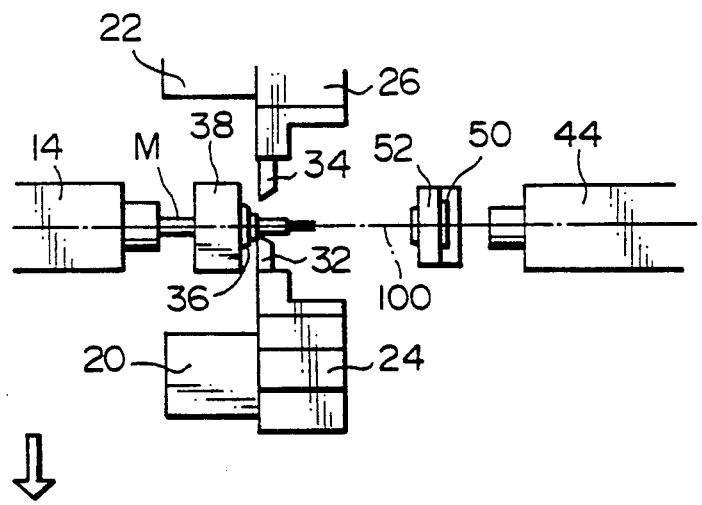
FIGS. 10A through 10D show a cycle of progressive machining steps of the second embodiment.

FIG. 10A shows the front machining step by the first headstock 14, during which the second headstock 44 is fully retracted to the right on the first machining axis 100.

Figure 10B:
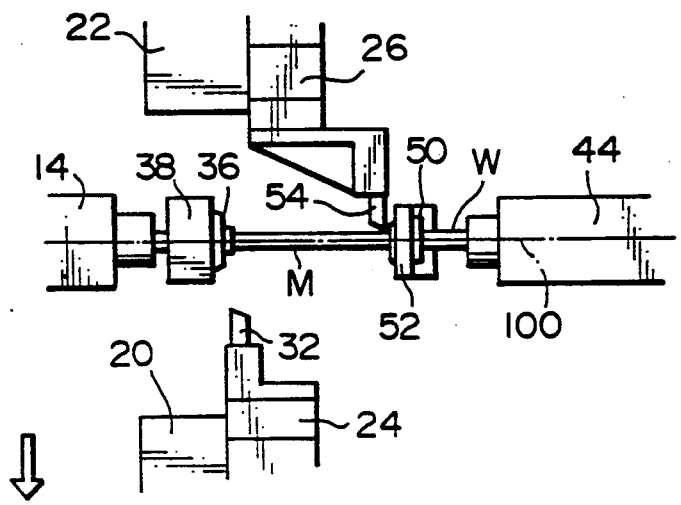

FIG. 10B shows the step in which the workpiece W is severed off the blank material M. In this embodiment, the blank material M is advanced from the first headstock 14 adequately, whereupon the workpiece W is cut off by the cutting tool 54 as it is supported by the second guide bush 50.

With this two-point support system, an adequately large overhang of the workpiece can be obtained during the front machining. The rear machining and the front machining can be started directly from the position of FIG. 10B, thus shortening the machining cycle to a minimum.

Figure 10C:
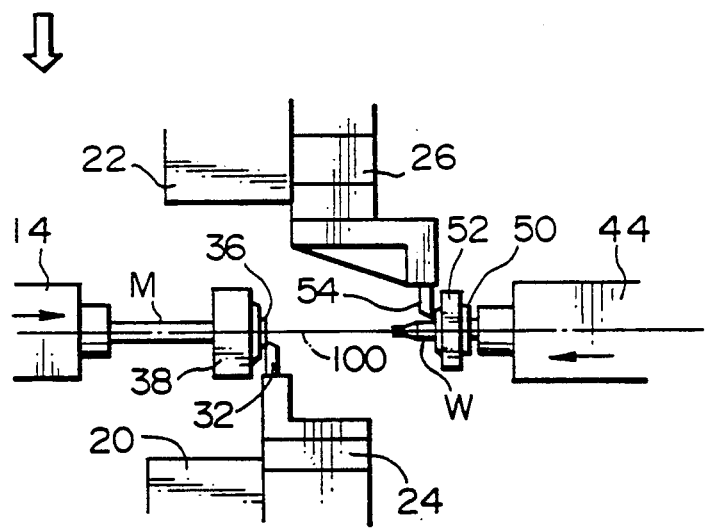

FIG. 10C shows the step in which the workpiece W severed off the blank material M is under the rear machining. At that time the blank material M is under the next front machining.

Figure 10D:
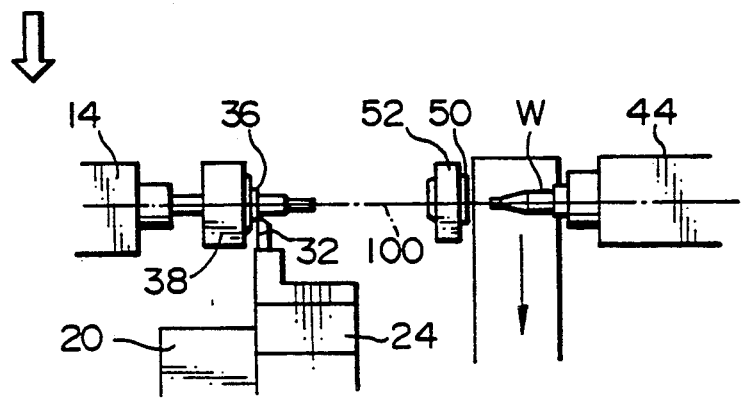

FIG. 10D shows the step in which the workpiece W completed with the rear machining is being discharged as indicated by an arrow. The various members is returned from this position to the position of FIG. 10A ready for the next rear machining. The foregoing steps are repeated. Thus a shortened automatic machining cycle has been completed.

Figure 11:
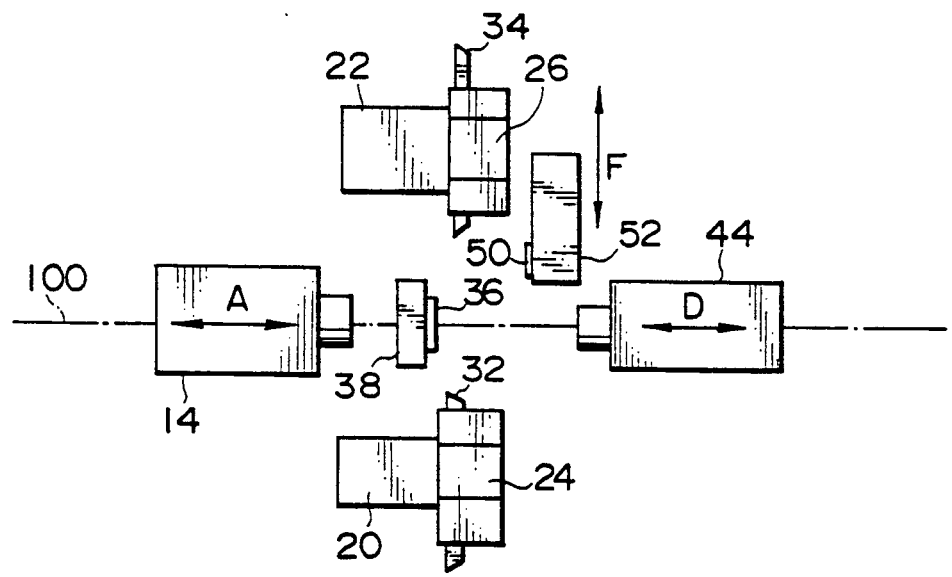
FIG. 11 is a schematic plan view showing a third embodiment of this invention.

FIG. 11 shows another modified lathe according to a third embodiment, in which the second headstock 44 is movable only along the first machining axis 100, and the second guide bush 50 is slidable in a direction perpendicular to the first machining axis 100, as indicated by an arrow F. The second guide bush 50 is retracted laterally from the first machining axis during the front machining, but can be located in alignment with the first machining axis 100 to perform a desired rear machining. Therefore, the lathe of this third embodiment is simple in construction. Further, easy and smooth movements of the cutting tools can be achieved within the machining range.

Figure 12:
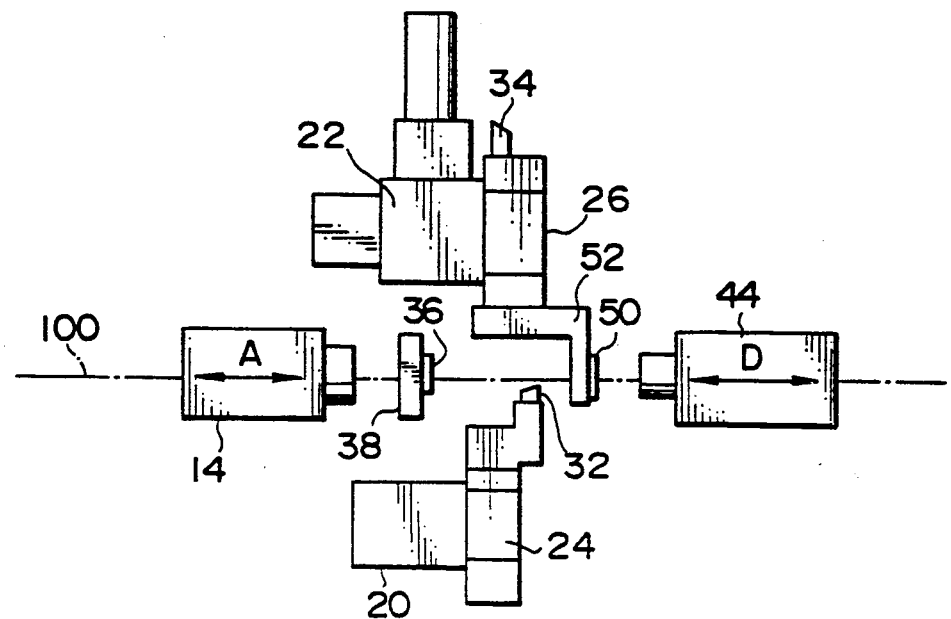
FIG. 12 is a view similar to FIG. 11, showing a fourth embodiment of this invention.

FIG. 12 shows still another modified lathe according to a fourth embodiment. Like the third embodiment, the second headstock 44 is slidable only on the first machining axis 100, and the second guide bush 50 is slidable perpendicularly to the first machining axis 100. For a feature different from the third embodiment, the second guide bush 50 is substituted for the cutting tools carried by the second turret 26. Accordingly it is possible to achieve the function of this invention with simple construction.

In this illustrated embodiment, the front and rear machinings are carried out on the left and right ends, respectively, of the bed. Alternatively, the front and rear machinings may be performed on the first and second headstocks parallel to each other according to need. Using a known root, the workpiece completed with the front machining is gripped, whereupon the workpiece is reoriented and moved to the second headstock located adjacent to the first headstock so that the second machining can be performed by the second headstock.

Alternatively, a plurality of second guide bushes different in diameter are arranged to meet with the shape of a workpiece. These second guide bushes may be optionally selectively used by a linear-drive index mechanism or a rotary index mechanism, or in combination thereof, which would cause an improved usefulness. Any combination of the foregoing changes and variations do not introduce new matter.

To sum up the foregoing, according to this invention, since the second guide bush is added to intermediately guide the workpiece during the rear machining, it is possible to take an adequately large overhang of the workpiece during the rear machining. Consequently a variety of kinds of machinings can be possible. Further the entire machining cycle can be divided into front and rear machinings, thus shortening the machining cycle to a minimum.

What is claimed is:

1. A method of machining a blank material on a headstock-reciprocating-type automatic lathe, said method comprising the steps of:

gripping one end of said blank material with a first headstock;

providing a first guide bush adjacent said first headstock to intermediately guide and support said blank material;

axially aligning said first headstock and said first guide bush along a first machining axis;

machining a front part of said blank material with a cutting tool to provide a workpiece while moving said first headstock and said blank material along said first machining axis and providing said first guide bush near a working point of said cutting tool;

holding a second headstock in a standby position remote from the first machining axis of the first headstock;

gripping an other end of the workpiece by the second headstock in axially alignment with the first headstock upon completion of machining of said front part;

severing the workpiece off the blank material, with the workpiece gripped by the second headstock;

providing a second guide bush adjacent said second headstock to intermediately guide and support said workpiece;

axially aligning said second headstock and said second guide bush along a second machining axis;

machining a rear part of said workpiece with a cutting tool while moving said first headstock along said second machining axis and providing said second guide bush near a working point of said cutting tool;

during machining of said rear part, machining a front part of a next blank material gripped by said first headstock; and upon completion of said rear machining, discharging the workpiece form said second headstock.

2. A method according to claim 1, wherein during said front machining by the first headstock, the second headstock stands by on a second machining axis remote from the first headstock.

3. A method according to claim 1, wherein during said front machining by the first headstock, the second headstock stands by on the first machining axis of the first headstock remotely therefrom.

* * * * *